United States Patent [19]

Takimoto et al.

[11] Patent Number: 4,636,922
[45] Date of Patent: Jan. 13, 1987

[54] LAMP MOUNTING STRUCTURE FOR SMALL SIZED VEHICLE

[75] Inventors: Hiroshi Takimoto, Shizuoka; Takumi Fukui, Iwata, both of Japan

[73] Assignee: Yamaha Hatsudoki Kabushiki Kaisha, Iwata, Japan

[21] Appl. No.: 759,947

[22] Filed: Jul. 29, 1985

[30] Foreign Application Priority Data

Jul. 31, 1984 [JP] Japan .................................. 59-160600

[51] Int. Cl.⁴ ............................................. F21V 33/00
[52] U.S. Cl. ........................................ 362/72; 362/80; 362/249
[58] Field of Search ....................... 362/61, 72, 80, 83, 362/227, 240, 249, 368, 382, 375

[56] References Cited

U.S. PATENT DOCUMENTS

| | | | |
|---|---|---|---|
| 1,981,450 | 11/1934 | Fenna | 362/61 |
| 4,356,536 | 10/1982 | Funabashi et al. | 362/287 |
| 4,539,627 | 9/1985 | Ogishima | 362/61 |

FOREIGN PATENT DOCUMENTS

0133931 8/1983 Japan .................................... 362/72

Primary Examiner—Charles J. Myhre
Assistant Examiner—David A. Okonsky
Attorney, Agent, or Firm—Ernest A. Beutler

[57] ABSTRACT

A light supporting arrangement for an off the road vehicle for mounting lights in a relatively light-weight flexible fender. The fender is provided with an opening and a more rigid light supporting frame is received within the opening and is adapted to support the lights.

12 Claims, 10 Drawing Figures

LAMP MOUNTING STRUCTURE FOR SMALL SIZED VEHICLE

BACKGROUND OF THE INVENTION

This invention relates to a lamp mounting structure for small sized vehicles and more particularly to an improved and rigid mounting arrangement for supporting the headlight of such a vehicle within an opening in its front fender.

A type of vehicle that presently enjoys considerable popularity is the off the road vehicle which is equipped with two or more low pressure tires and which is designed primarily to accommodate a single rider. Because of their very nature, such vehicles are designed to have extremely light weight and for this purpose they normally employ a front fender or front fenders that are formed from a light weight plastic material such as polypropylene. If the vehicle is equipped with headlights, it is desirable to mount the headlights within the fender assembly so as to protect the headlight from damage. However, if the headlight is mounted directly to the front fender, there are considerable difficulties in conjunction with the aiming of the headlights due to the extreme flexibility of the front fenders. Also, if the vehicle employs a pair of front headlights, the problems attendant with prior art constructions are further magnified since it is difficult to correctly align the headlights with each other when they are supported directly by a flexible front fender. Although the problem may be avoided in part by providing a more rigid fender and/or more rigid mounting of the fender and headlights, such expedients add considerably to the weight of the vehicle and are undesirable.

It is, therefore, a principal object of this invention to provide an improved mounting arrangement for the lights of an off the road vehicle.

It is a further object of this invention to provide a light mounting arrangement for an off the road vehicle wherein a pair of lights will be held in rigid relationship to each other and still be protected and reinforced by the front fender assembly.

SUMMARY OF THE INVENTION

This invention is adapted to be employed in a lighting arrangement for an off the road vehicle having a frame, a relatively flexible fender assembly mounted by the frame and defining an opening, a light supporting frame positioned within the fender opening and supported by and reinforcing the fender, and means for mounting a light within said light supporting frame.

DETAILED DESCRIPTION OF THE PREFERRED EMBODIMENT

Figure 1:
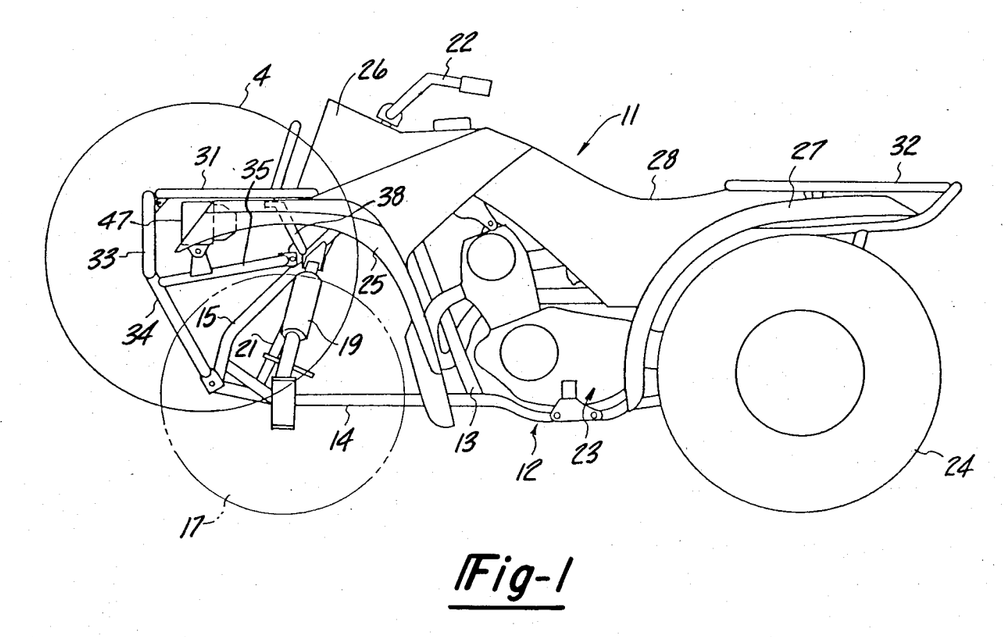
FIG. 1 is a side elevational view of an off the road vehicle constructed in accordance with an embodiment of the invention.
Figure 2:
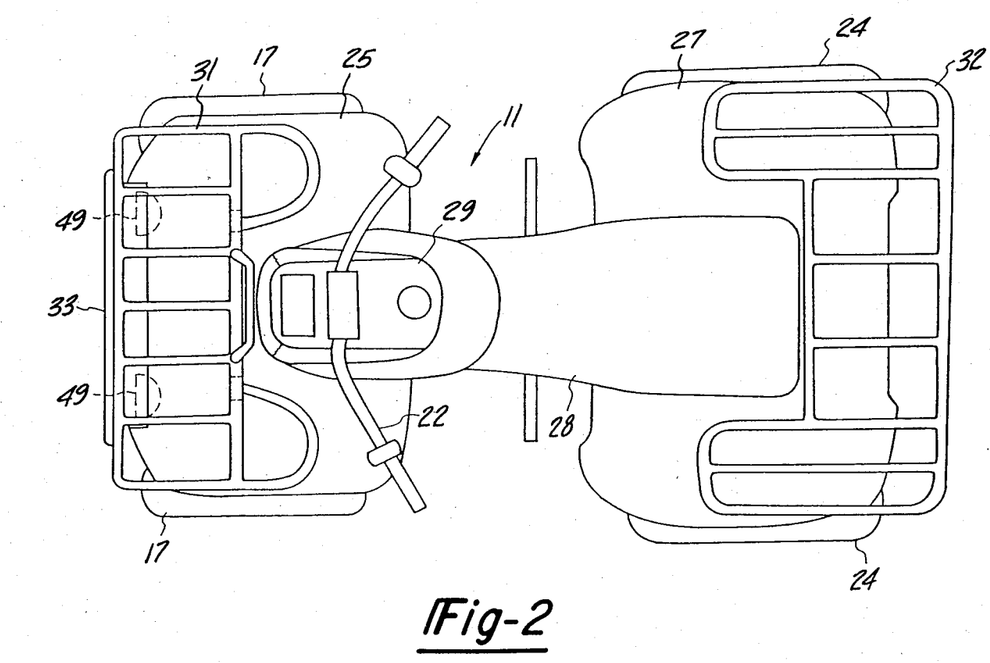
FIG. 2 is a top plan view of the vehicle.
Figure 3:
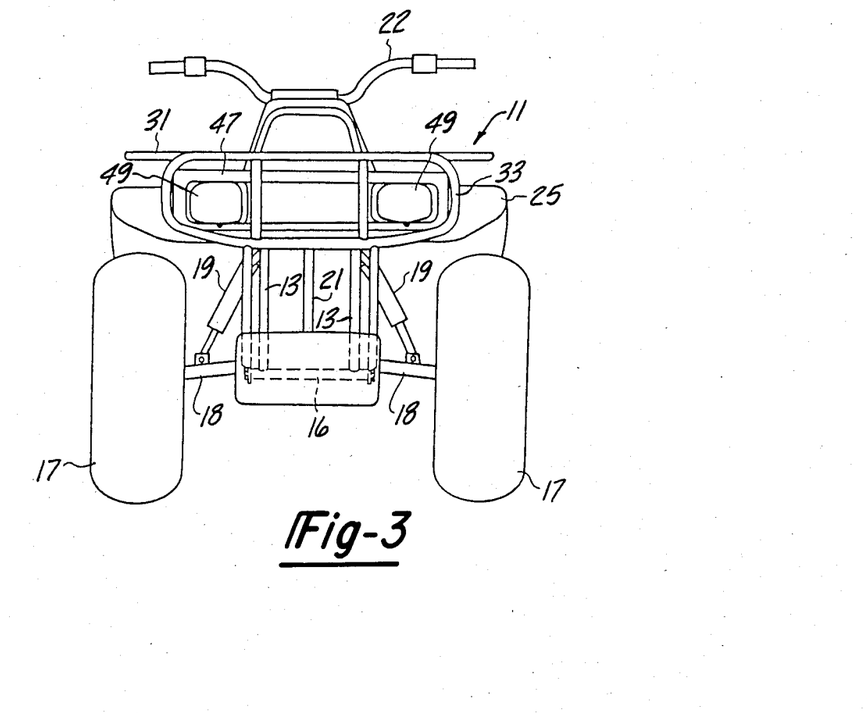
FIG. 3 is a front elevational view of the vehicle.

Referring first to FIGS. 1 through 3, an off the road vehicle having a lighting system constructed in accordance with an embodiment of the invention is identified generally by the reference numeral 11. The vehicle 11 includes a frame assembly, indicated generally by the reference numeral 12 and which is of the welded up tubular configuration. The frame 12 includes a pair of transversely spaced apart down tubes 13 that are affixed, as by welding, at their lower ends to a pair of horizontally extending bottom pipes 14. The forward ends of the bottom pipes 14 are affixed, as by welding or bolting, to the lower ends of a pair of support pipes 15. The upper ends of the support pipes 15 are affixed in a suitable manner (not shown) to the down tubes 13 so as to provide a triangular construction. A cross pipe 16 is affixed to the juncture of the bottom tubes 14 and the lower ends of the support tubes 15 so as to provide transverse stiffness.

A pair of front wheels carrying low pressure, balloon tires 17 are carried by means of a pair of suspension arms 18 that are pivotally connected to the frame assembly and which have their suspension travel controlled by combined spring and shock absorber assemblies 19 that are loaded between the suspension arms 18 and the frame assembly 12. The front wheels 17 are steered by means of a steering mechanism including a steering shaft 21 and handlebar assembly 22.

A combined engine, transmission assembly, indicated generally by the reference numeral 23, is supported by the frame assembly 12 and drives a pair of rear wheels that carry low pressure, balloon tires 24 in a known manner. The balloon tires on the wheels 17 and 24 are of the wide profile type and are inflated to a very low pressure such as a pressure in the range 0.1 to 0.3 $Kg/cm^2$.

A body assembly is supported on the frame 12 and is formed primarily of a light weight plastic material such as polypropylene or the like. This body includes a front fender 25 that overlies the front wheels 17 and which is connected to or integrally formed with a front cowling 26. A similar rear fender assembly 27 is carried rearwardly of the frame assembly 12 and overlies the rear wheels 24. A seat 28 is positioned between the front cowling 26 and the rear fender 27 and is designed primarily to accommodate a single rider. Forwardly of the seat 28 and carried by the frame assembly 12 is a gas tank 29 for supplying fuel to the engine of the engine, transmission assembly 23.

The vehicle 11 is further provided with a tubular frame front carrier 31 that is positioned over the front wheel 17 and a similar tubular frame rear carrier 32 that is positioned above the rear wheels 24. The carriers 31 and 32 are also disposed above the respective fenders 25 and 27. The rear carrier 32 is affixed to the frame 12 in any suitable manner.

Figure 4:
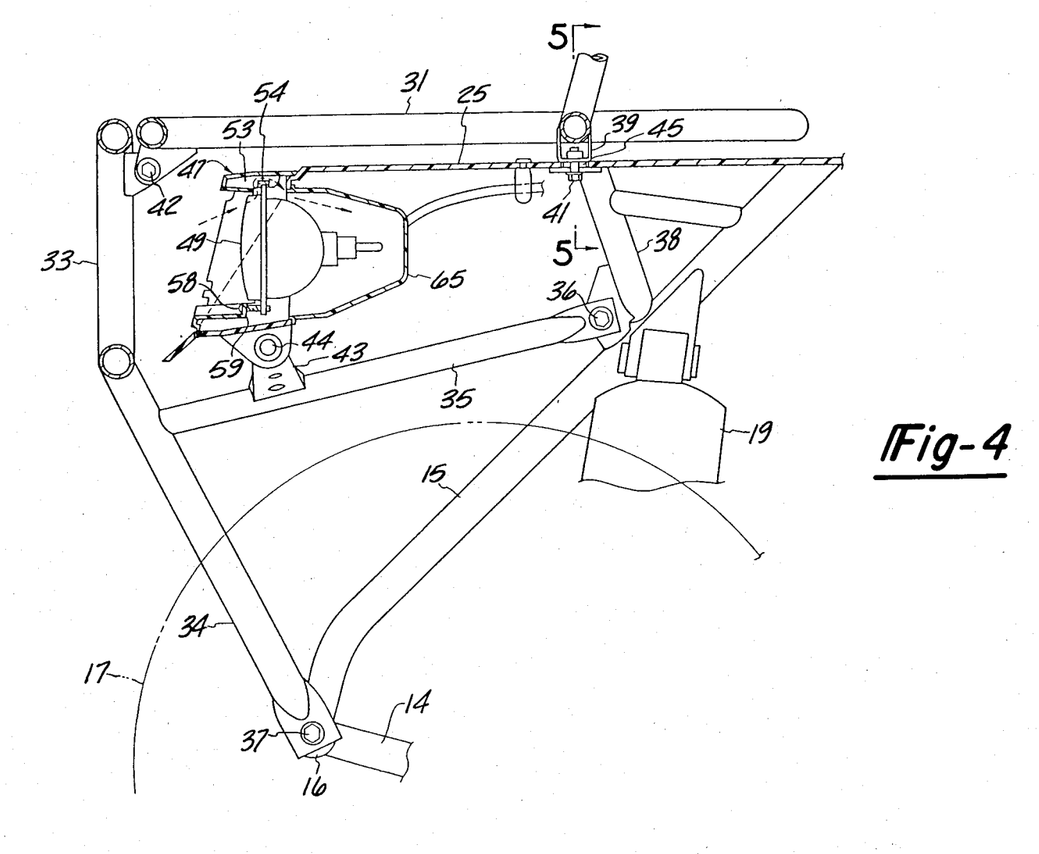
FIG. 4 is an enlarged view taken generally of the area encompassed by the circle 4 in FIG. 1, with certain components broken away and other components shown in section.
Figure 5:
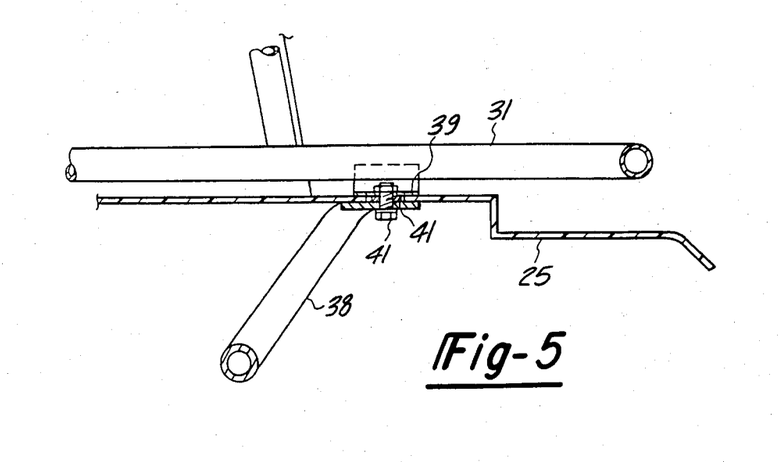
FIG. 5 is a cross-sectional view taken along the line 5—5 of FIG. 4.

Referring now to FIGS. 4 and 5, the front carrier 31 is supported at its forward end by a tubular type front bumper assembly 33. The bumper assembly 33 is, in turn, affixed to the frame assembly 12 by means including pairs of bumper stays 34 and 35. The bumper stays 34 and 35 are welded to each other at their forward ends and are affixed at their rearward ends to the front support pipes 15 by means of bolt and nut assemblies 36 and to the lower end of the front support pipe 15, lower tubes 14 and cross tubes 16 by means of bolt and nut assembies 37. There are similar mounting arrangements at each side of the vehicle and this mounting is shown best in FIG. 4.

A carrier stay 38 is positioned at each side of the frame and is connected to the front support pipe 15 and to the front carier 31 at the respective side by means of a bracket 39 and bolt and nut assembly 41. Thus, the front carrier 31 is rigidly supported from the frame assembly through the bumper 33 and front portion of the frame assembly. In this regard, the front end of the carrier 31 is connected at its opposite sides to the front bumper assembly 33 by means of bolts 42. In this way, the loads from the front bumper assembly 33 are transmitted to the frame through the front carrier 31 and loads from the front carrier 31 are transmitted to the frame in part through the front bumper assembly 33.

As has been noted, the front fender assembly 25 is formed from a low weight, relatively flexible synthetic resin such as polypropylene and the entire body consisting of the front fender 25, rear fender 27 and seat 28 and cowl 26 may be formed as a single molding or pressing. The front fender 25 is relatively flexible and is carried by the frame assembly 12 by means including a connection to the bumper stay 35 through brackets 43 and bolt and nut assemblies 44 at each side of the front fender assembly 25. The front fender assembly is also affixed relative to the attachment of the carrier 31 to the carrier stay 38 where it has an opening that passes the bolt 41 and in which is received a resilient grommet 45 that has a slightly greater thickness so that the front fender is not firmly clamped therein but is thus relatively loosely mounted.

Referring now additionally to the remaining figures, the front fender 25 is provided with a forwardly facing recessed opening 46 that is adapted to receive a more rigid headlight supporting frame, indicated generally by the reference numeral 47, in a manner to be described. The opening 46 is generally rectangular in configuration and is somewhat inclined due to the configuration of the front fender 25 as may be best seen by reference to FIG. 7.

Figure 7:
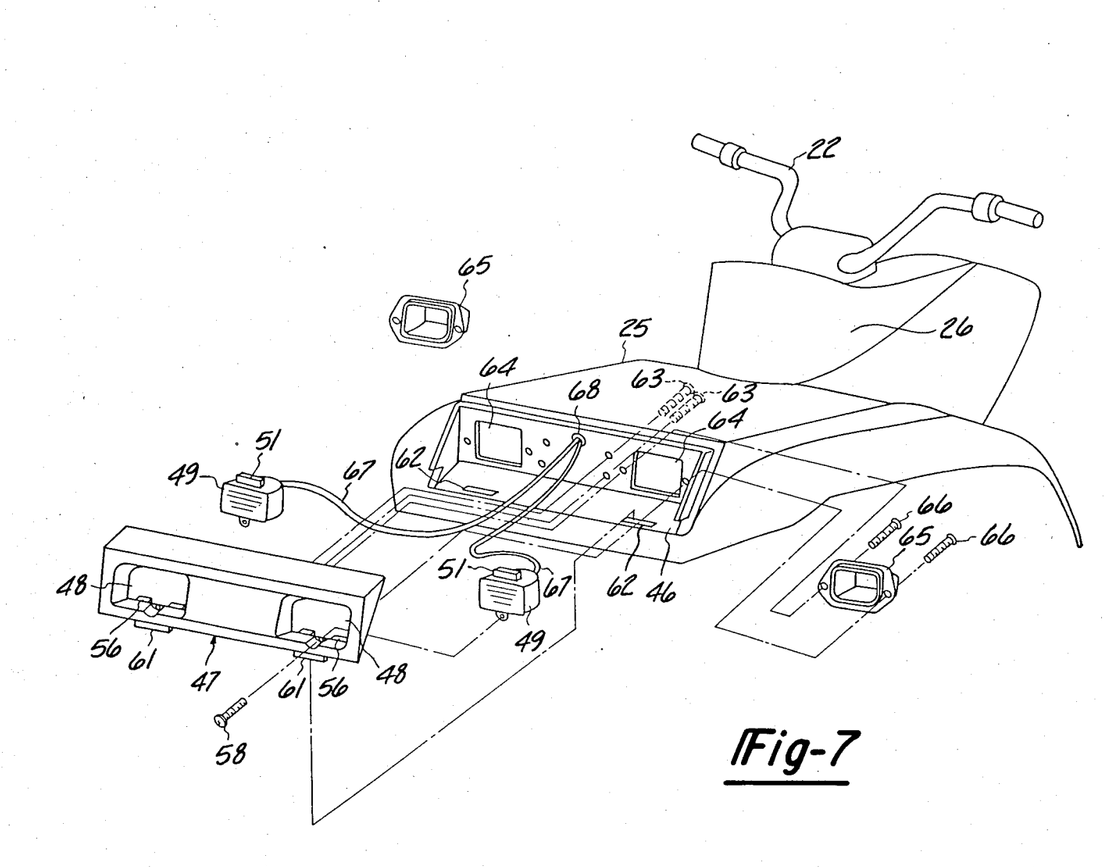
FIG. 7 is an exploded, perspective view showing the front fender, headlight and headlight mounting arrangement.
Figures 8, 9, 10:
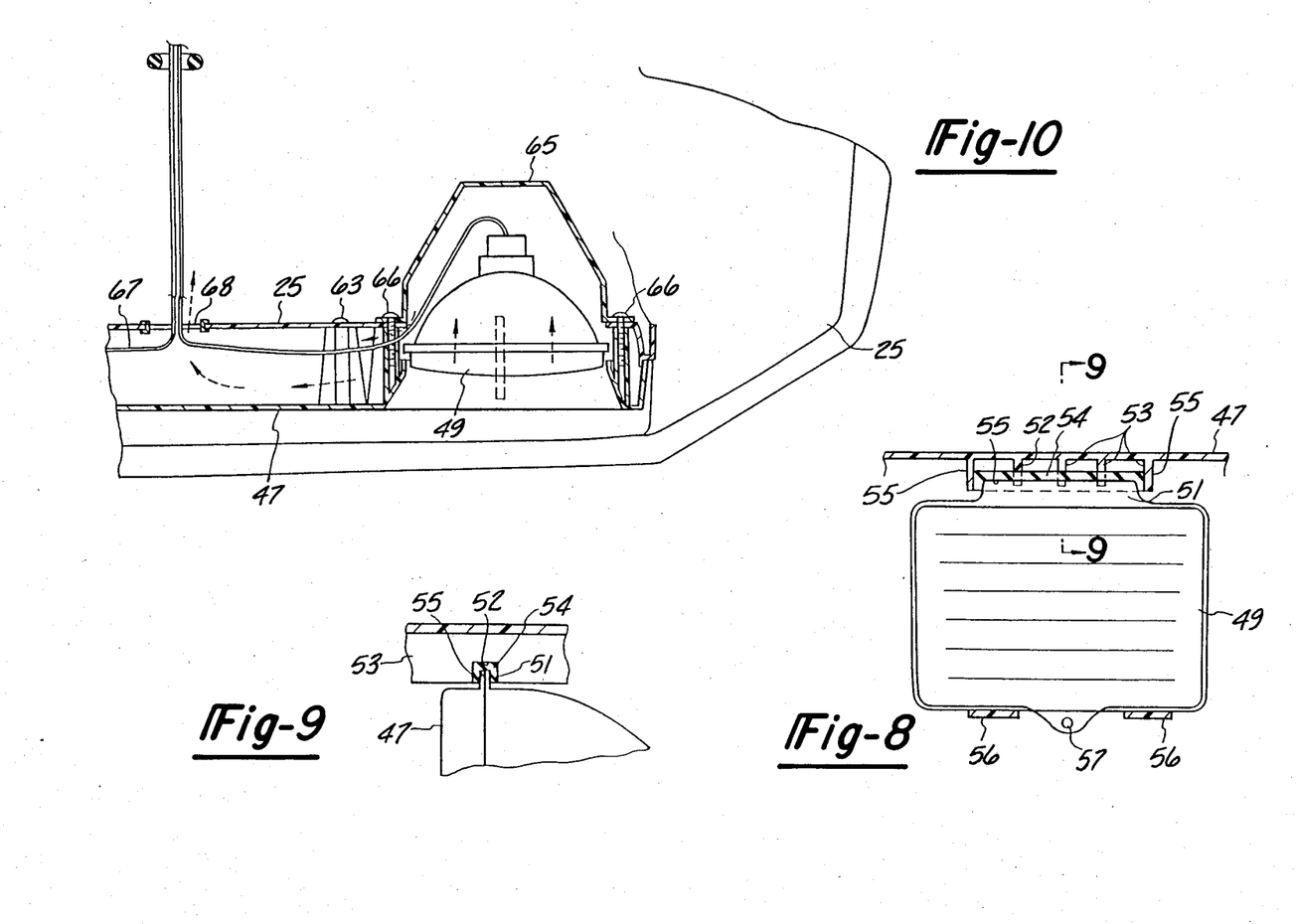
FIG. 8 is an enlarged, front elevational view showing the headlight and its mounting arrangement in the headlight mounting frame.
FIG. 9 is a cross-sectional view taken along the line 9—9 of FIG. 8.
FIG. 10 is a cross-sectional view taken along the line 10—10 of FIG. 6.

The headlight mounting frame 47 has a generally complimentary configuration and is formed with a pair of headlight receiving openings 48 which are generally rectangular in configuration and which receive a pair of like shaped headlights 49. The headlights 49 are formed with a retaining flange 51 at their upper end which flange is received within a plurality of complementary shaped grooves 52 formed in central, longitudinally extending ribs 53 formed by the frame 47 around the openings 48. A rubber pad 54 is received in the grooves 52 and, in turn, has a groove 55 to receive the headlight mounting flange 51. A pair of outer ridges 55 of the headlight mounting frame 47 contact the opposite sides of the pad 54 and transversely position the headlight assemblies 49.

The lower portion of the headlight openings 48 are formed with a pair of pads 56 that slidably support the lower edge of each headlamp 49 on opposite sides of an adjusting tang 57. The tang 57 has an opening that is adapted to pass an adjusting screw 58 for adjusting the vertical aiming of the headlight. The adjusting screw 58 cooperates with a support wall 59 through which the adjusting screw 58 passes, which support wall forms a portion of the frame 47.

It should be readily apparent that rotation of the adjusting screw 58 will cause vertical aiming adjustment of the headlights 49 since pivotal movement is permitted by the pad 54 which pivotally supports the upper end of the headlight mounting flange 51. The headlight mounting frame 47 may be formed from any suitable material such as a synthetic resin but is designed to be more rigid than the fender assembly 25 so that the individual headlight assemblies 49 will be rigidly retained relative to each other. The headlight mounting frame 47 is rigidly mounted within the front fender recess 47 by means including a pair of depending tabs 61 formed on the underside of the frame 47 which extend into complementary shaped openings 62 formed in the fender 25 and specifically at the opening 47. A plurality of screws 63 extend through openings in the fender 47 and are threaded into the frame 47 for retaining the headlight mounting frame 47 in position.

Figure 6:
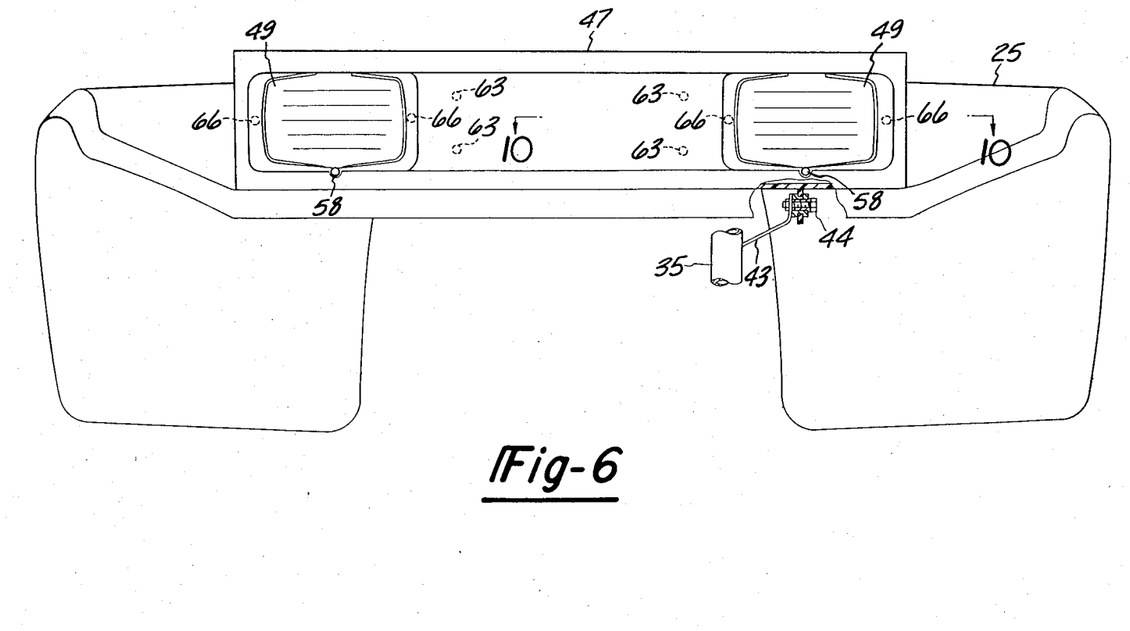
FIG. 6 is an enlarged, front elevational view showing the front fender and headlight mounting arrangement.

The fender opening 46 is provided with a pair of openings 64 that are aligned with the rear ends of the headlights 49. These openings are closed by means of cover plates 65 that are held in place by means of screws 66 which pass through openings formed in the fender 25 and are threaded to the headlight mounting frame 47 so as to seal the headlight assemblies 49 against dust, dirt and other foreign matter which will be encountered due to the off the road use for which the vehicle 11 is intended. Also, this serves to further reinforce the fender 25.

Electrical power is supplied to the headlights 49 by means of conductors 67 that extend to each headlight 49 and which pass through a central, grommeted opening 68 formed in the fender 25 for attachment to the appropriate switch (not shown) and power source. The opening 68 is also sized sufficiently so that air may flow around the headlight assemblies 49 and through the area between the mounting frame 47 and fender 25 and pass through the opening 68 so as to afford cooling for the headlight assemblies 49. This cooling air flow path is best shown in FIG. 10 by the dotted line arrows.

It should be readily apparent from the foregoing description that the described construction provides an extremely rigid mounting for the individual headlights independently of the fact that the fender 25 is relatively light in weight and flexible and yet the mounting will offer convenient access and cooling for the headlights as well as their adjustment and servicing. In addition, the headlight mounting frame serves to reinforce the front fender. Although the invention has been described in conjunction with the mounting for the headlights, it should be readily apparent to those skilled in the art that a similar arrangement may be used for mounting the tail lights of the vehicle.

Although an embodiment of the invention is illustrated and described, various changes and modifications may be made without departing from the spirit and scope of the invention, as defined by the appended claims.

We claim:

1. A lamp mounting arrangement for an off the road vehicle having a frame, a relatively flexible body assembly mounted on said frame and defining an opening, a light supporting frame positioned within said body assembly opening and supported by and reinforcing said body assembly, said light supporting frame being rigidly fixed to said body assembly, said light supporting frame being substantially more rigid than said body assembly, and means for mounting a light within said light supporting frame.

2. A lamp mounting arrangement as set forth in claim 1 wherein the light supporting frame is directly affixed by threaded fastening means to the flexible body assembly.

3. A lamp mounting arrangement as set forth in claim 1 wherein the body assembly opening is elongated and the light supporting frame has openings to receive a pair of lights and means for mounting a pair of lights within said light supporting frame.

4. A lamp mounting arrangement as set forth in claim 3 further including means for permitting air to flow across the lights supported within the light supporting frame and pass through an opening adapted to pass conductors for carrying electricity to the lights.

5. A lamp mounting arrangement as set forth in claim 1 wherein the body assembly is supported with an opening aligned with the frame opening and further including a rear cover affixed to the light supporting frame by fasteners passing through the body assembly for protecting the light and further adding to the rigidity thereof.

6. A lamp mounting arrangement as set forth in claim 5 wherein the rear cover, light supporting frame and flexible body assembly are all affixed to each other by threaded fastening means passing therethrough.

7. A lamp mounting arrangement as set forth in claim 5 wherein the body assembly opening is elongated and the light supporting frame has openings to receive a pair of lights and means for mounting a pair of lights within said light supporting frame.

8. A lamp mounting arrangement as set forth in claim 7 further including means for adjusting the position of the lights relative to the frame for aiming the lights.

9. A lamp mounting arrangement as set forth in claim 1 wherein the body assembly comprises a front cowling member adapted to cover a pair of front wheels as a front fender.

10. A lamp mounting arrangement as set forth in claim 9 wherein the light supporting frame is directly affixed by threaded fastening means to the flexible body assembly.

11. A lamp mounting arrangement as set forth in claim 10 wherein the body assembly is supported with an opening aligned with the frame opening and further including a rear cover affixed to the light supporting frame by fasteners passing through the body assembly for protecting the light and further adding to the rigidity thereof.

12. A lamp mounting arrangement as set forth in claim 11 wherein the rear cover, light supporting frame and flexible body assembly are all affixed to each other by threaded fastening means passing therethrough.

* * * * *